(12) United States Patent
Nguyen et al.

(10) Patent No.: US 10,001,818 B2
(45) Date of Patent: Jun. 19, 2018

(54) COMPUTER WITH CABLE ACCESS DOOR

(71) Applicant: NCR Corporation, Duluth, GA (US)

(72) Inventors: Thinh Nguyen, Suwanee, GA (US); Seng Chan, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days. days.

(21) Appl. No.: 15/220,853

(22) Filed: Jul. 27, 2016

(65) Prior Publication Data

US 2018/0032112 A1    Feb. 1, 2018

(51) Int. Cl.
| | |
|---|---|
| *G06F 1/18* | (2006.01) |
| *G06F 1/16* | (2006.01) |
| *A47B 21/06* | (2006.01) |
| *H01R 13/72* | (2006.01) |

(52) U.S. Cl.
CPC ............ *G06F 1/182* (2013.01); *A47B 21/06* (2013.01); *G06F 1/1656* (2013.01); *G06F 1/181* (2013.01); *H01R 13/72* (2013.01)

(58) Field of Classification Search
CPC ........ G06F 1/1633; G06F 1/203; G06F 1/182; G06F 1/1656; G06F 1/1675; G06F 1/20; G06F 1/1613
USPC .......... 361/679.46–679.54; 312/223.1–223.6, 312/10.1, 7.1, 7.2, 283–290
See application file for complete search history.

(56) References Cited

U.S. PATENT DOCUMENTS

| | | | | |
|---|---|---|---|---|
| 4,988,831 A | * | 1/1991 | Wilson ................. | H05K 5/0247 174/135 |
| 5,339,213 A | * | 8/1994 | O'Callaghan ....... | G06F 3/03547 248/442.2 |
| 5,345,362 A | * | 9/1994 | Winkler ............. | A61N 1/37235 248/456 |
| 5,816,081 A | * | 10/1998 | Johnston ............ | E05B 73/0005 220/242 |
| 5,837,942 A | * | 11/1998 | Becker .................... | G06F 1/181 174/135 |
| 5,906,506 A | * | 5/1999 | Chang .................. | G06F 1/1616 439/500 |
| 5,974,742 A | * | 11/1999 | Schreiner ............... | A47B 21/06 52/239 |
| 6,042,007 A | * | 3/2000 | Nugent, Jr. .......... | G07G 1/0018 235/383 |
| 6,104,451 A | * | 8/2000 | Matsuoka ......... | G02F 1/133308 349/58 |

(Continued)

FOREIGN PATENT DOCUMENTS

| | | |
|---|---|---|
| CN | 202677281 U | 1/2013 |
| DE | 202016100727 | 3/2016 |

OTHER PUBLICATIONS

European Search Report dated Nov. 6, 2017 issued in European Patent Application 17183090.4.

*Primary Examiner* — Binh Tran
*Assistant Examiner* — Douglas Burtner
(74) *Attorney, Agent, or Firm* — Schwegman, Lundberg & Woessner

(57) ABSTRACT

A computer with cable access door which securely conceals connected cables. In one example embodiment, the computer includes a housing including a cable access door having an open position and a closed position and a connector within the housing for connecting to a cable originating from outside the housing. The cable access door conceals the connector and the cable when the cable access door is in the closed position.

9 Claims, 6 Drawing Sheets

(56) References Cited

U.S. PATENT DOCUMENTS

| | | | | |
|---|---|---|---|---|
| 7,633,749 | B2* | 12/2009 | Hughes | H05K 5/0247 |
| | | | | 361/679.02 |
| 8,315,040 | B2* | 11/2012 | Roberts | A63H 17/262 |
| | | | | 361/622 |
| 2008/0253077 | A1* | 10/2008 | Miyamoto | G06F 1/187 |
| | | | | 361/679.31 |
| 2009/0322626 | A1* | 12/2009 | Sato | G06F 1/162 |
| | | | | 343/702 |
| 2010/0013742 | A1* | 1/2010 | Unger | F16M 11/10 |
| | | | | 345/55 |
| 2012/0246868 | A1* | 10/2012 | Hunt | A47B 21/06 |
| | | | | 16/2.1 |
| 2013/0198017 | A1* | 8/2013 | Minegishi | G06F 1/1613 |
| | | | | 705/16 |
| 2015/0149311 | A1* | 5/2015 | Ward | G07G 1/0018 |
| | | | | 705/24 |
| 2015/0157537 | A1* | 6/2015 | Lanigan | A61J 1/2096 |
| | | | | 141/349 |
| 2016/0128238 | A1* | 5/2016 | Shedd | F25B 23/006 |
| | | | | 361/679.47 |

* cited by examiner

COMPUTER WITH CABLE ACCESS DOOR

BACKGROUND

Computer terminals used in retail point-of-sale (POS) and other environments typically have many ports and other connectors for power, monitor, keyboard, mouse, and a variety of peripherals, with many connected cables. Many consider cable connectors to be unsightly. Exposed cables are also subject to a risk of being disconnected Therefore, it would be desirable to provide a computer terminal with a cable access door that helps maintain cable connections and shield them from view.

SUMMARY

A computer with cable access door is provided.

In one example embodiment, the computer includes a housing including a cable access door having an open position and a closed position and a connector within the housing for connecting to a cable originating from outside the housing. The cable access door conceals the connector and the cable when the cable access door is in the closed position.

In another example embodiment, the computer includes a housing including an upper portion and a lower portion. The upper portion includes a cable access door having an open position and a closed position. The lower portion includes an aperture opposite the cable access door. A connector panel in the housing extends between the cable access door and the aperture, and the connector panel includes a plurality of connectors for connecting to cables originating from outside the housing and passing through the aperture from underneath the housing. The cable access door conceals the connector and the cables when the cable access door is in the closed position.

DETAILED DESCRIPTION

Figure 1:
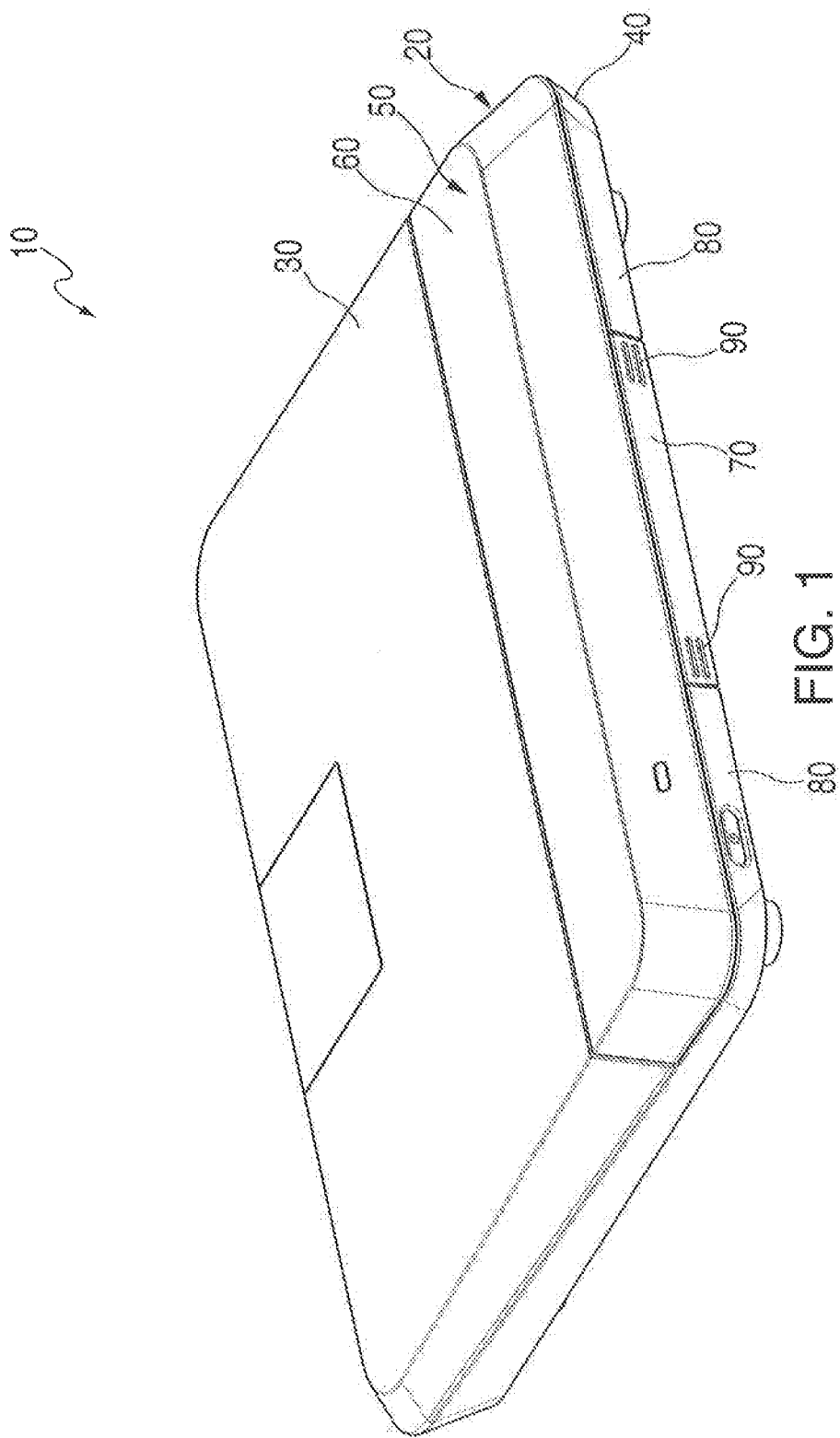
FIG. 1 is a perspective view of an example computer with a cable access door in a closed position.
Figure 2:
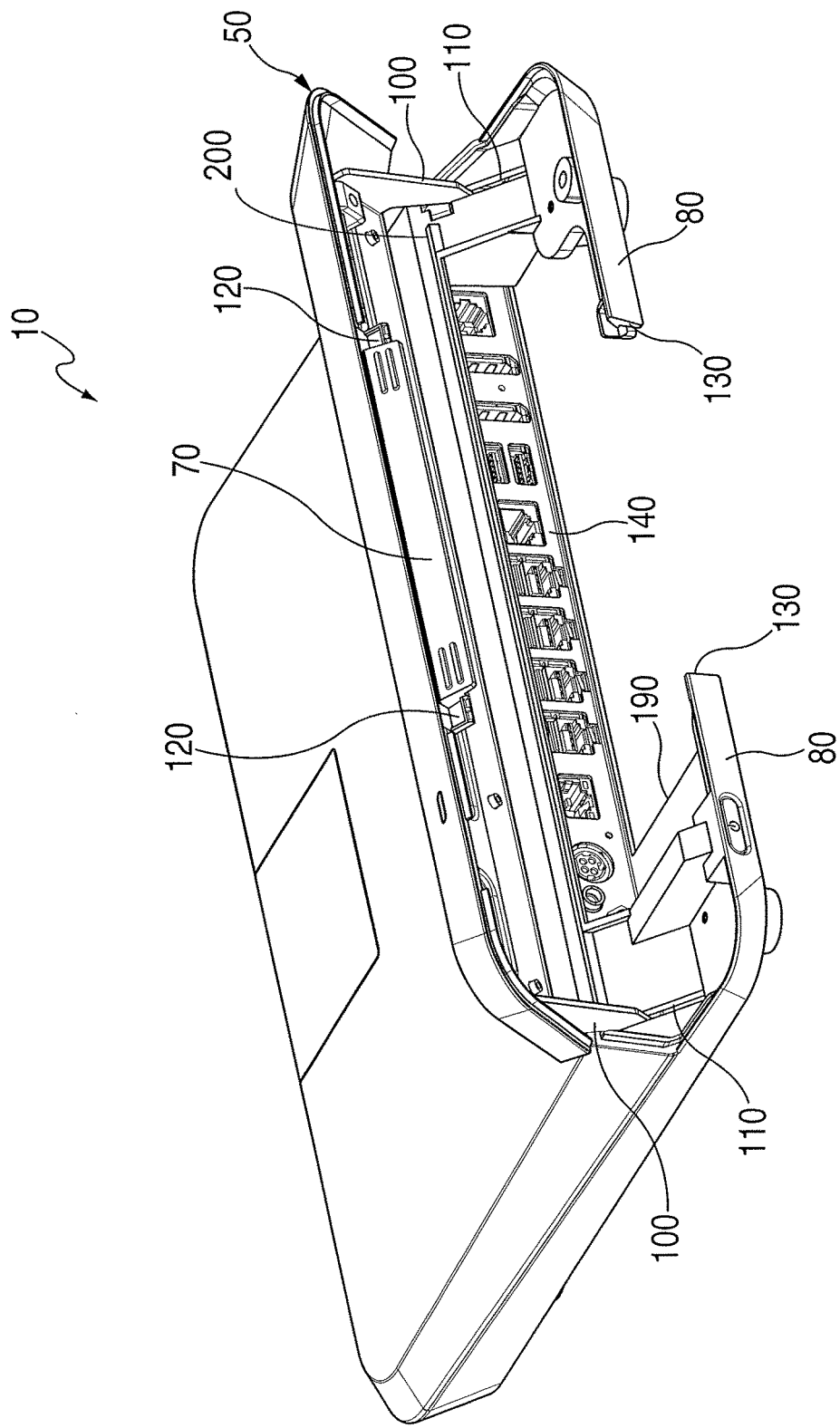
FIG. 2 is a perspective view of the example computer with the cable access door in a partially open position.
Figure 3:
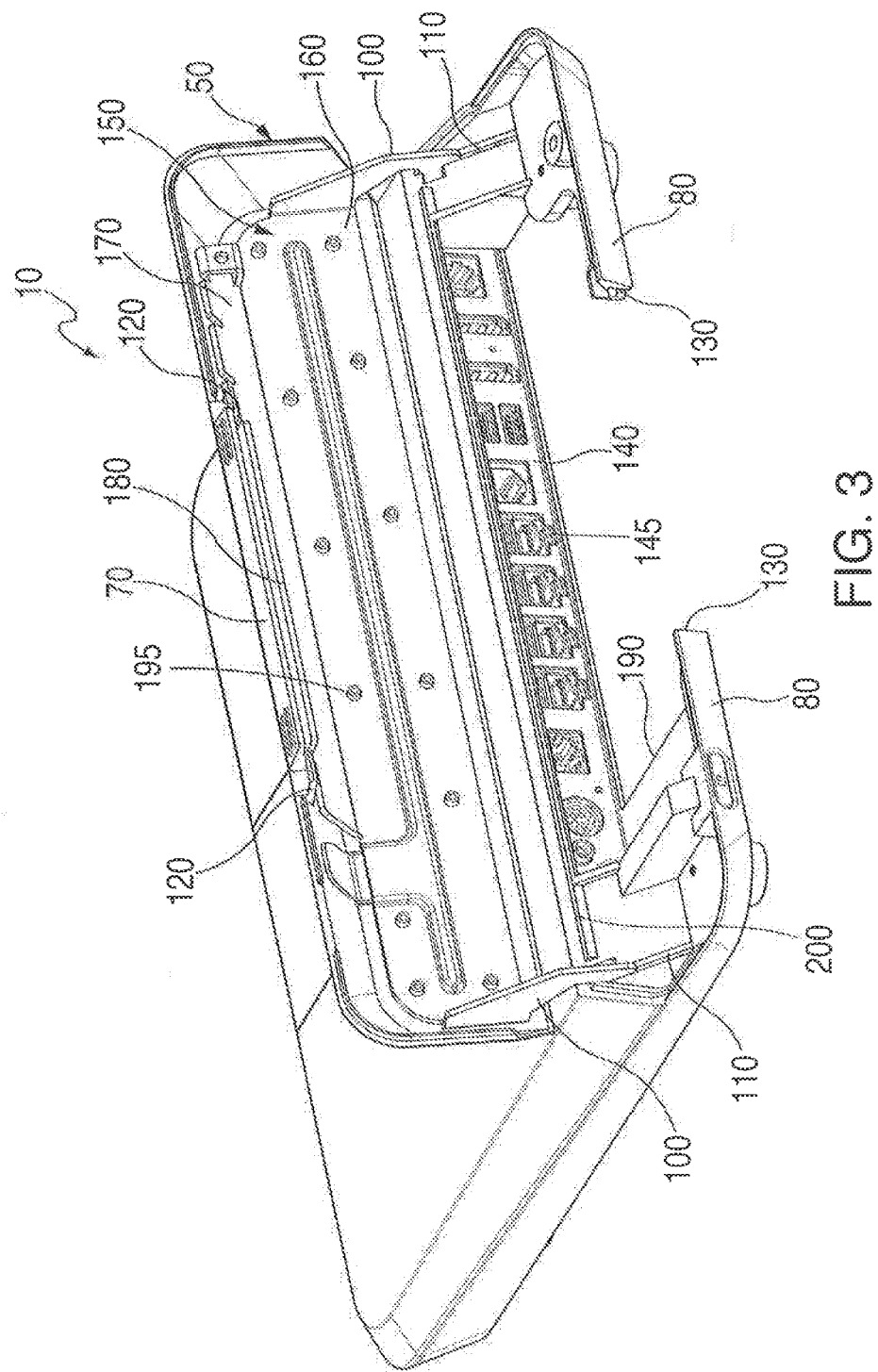
FIG. 3 is a perspective view of the example computer with the cable access door in a fully open position.

Referring now to FIGS. 1-3, an example computer 10 includes a housing 20. Housing 20 includes an upper housing portion 30, a lower housing portion 40, and cable access door 50.

Cable access door 50 includes a first cover portion 60 adjacent upper housing portion 30. In the example embodiment, cable access door 50 may alternatively be viewed as being part of upper housing portion 30. Cable access door 50 further includes a second cover portion 70 extending between opposite side portions 80 of lower housing portion 40. Second cover portion 70 is flexible to facilitate opening of cable access door 50, and may additionally include tactile members 90 on each end, which aid an operator in opening cable access door 50.

With reference to FIGS. 2 and 3, cable access door 50 has cable retention features which prevent cable access door 50 from unintentionally opening. One cable retention feature is plate 150. Plate 150 includes a first portion 160, which supports the top portion of cable access door 50. A second portion 170 supports the contoured surface of cable access door 50. A third portion 180 reinforces lower cover portion 70.

Since housing 20 may be made of plastic, plate 150 may also serve to strengthen cable access door 50 against breakage and maintain its shape following manufacture. In one example, plate 150 may be added during manufacturing to prevent warping of cable access door 50. Plate 150 may be attached with heat stake posts 195 through corresponding apertures in plate 150, which is a lower cost option than using screws and eliminates the need for corresponding mounting bosses that would decrease the available underlying space for cables.

To further protect cable access door 50 from breakage, housing 20 includes edge support 200. Edge support 200 supports the long edge of cable access door 50 adjacent upper housing portion 30.

Figure 4:
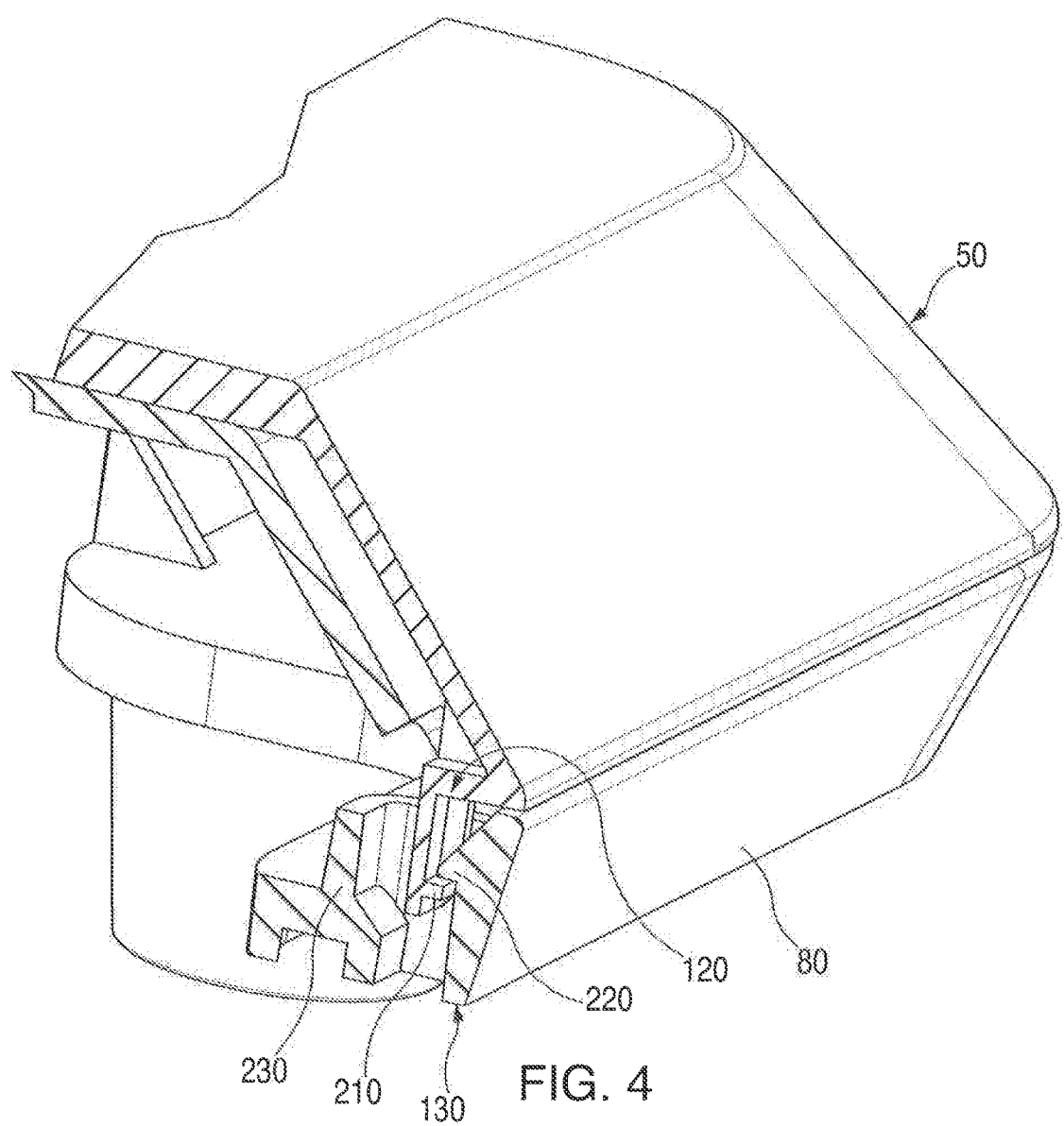
FIG. 4 is a cross-section of the example computer illustrating a latch feature of the cable access door.

Another cable retention feature is the cable door latching mechanism. First cover portion 60 includes snaps 120 on opposite sides of lower cover portion 70, close to tactile members 90. With reference to FIG. 4, snaps 120 are aligned with, and engage, opposing latch members 130 of side portions 80. Each latch member 130 includes a latch hook 220 which engages a corresponding snap hook 210 on each of snaps 120. Opposing forces between snap hook 210 and latch hook 220 are substantially vertical. Thus, the outward orientation of snap hook 210 strengthens the locking force when a transverse pressure is applied against the inside of cable access door 50 by connected cables.

In the example embodiment, an operator opens cable access door 50 by gently pressing on tactile members 90 to slightly bend lower cover portion 70 and snaps 120 inwards, thereby allowing snap hooks 210 disengage from latch hooks 220. Part of the force required to release snaps 120 may include opposing forces from cables on the opposite side of lower cover portion 70. A stop portion 230 of each latch member 130 limits bending of lower cover portion 70 and snaps 120 to prevent breakage. The operator continues to press tactile members 90 while rotating cable access door 50 upwards until snaps 120 have cleared latch members 130.

Closing cable access door 50 involves rotating cable access door 50 downwards until snap hooks 210 engage latch hooks 220.

Figure 5:
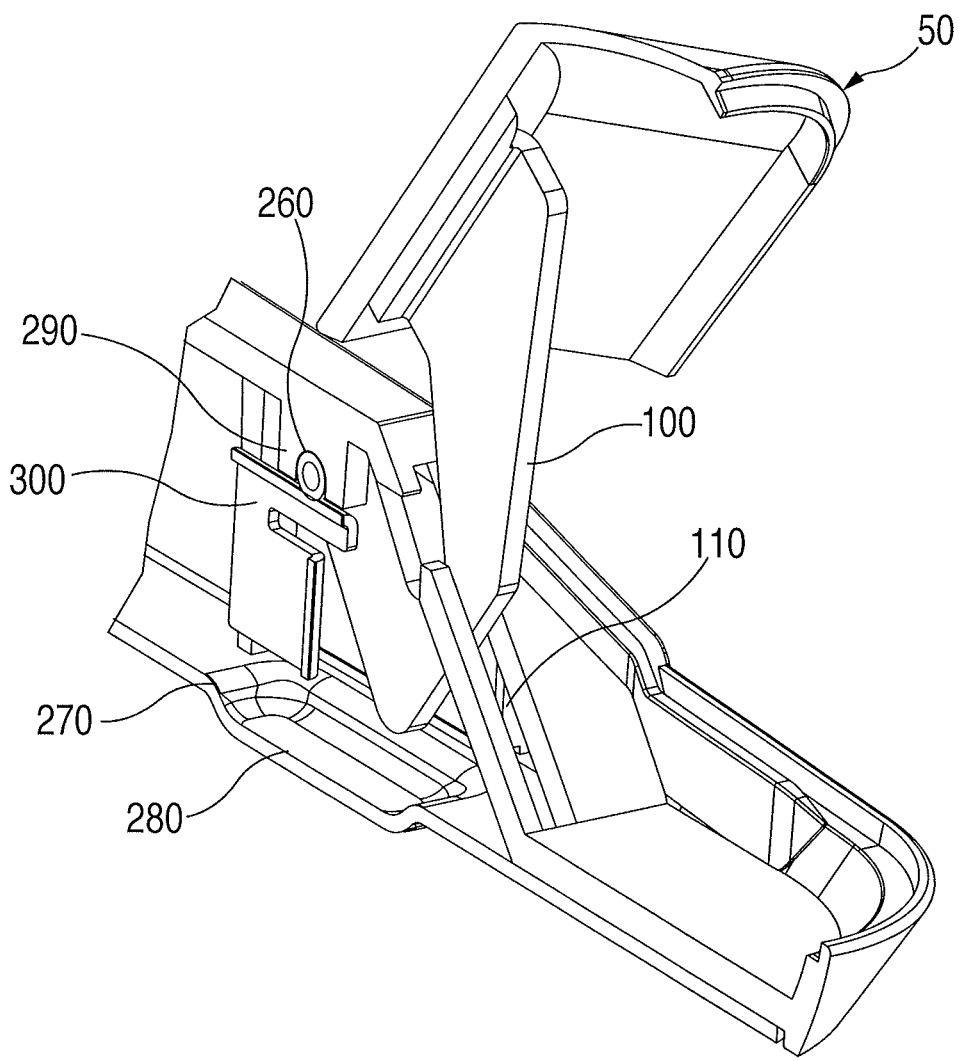
FIG. 5 is a partial view the example computer illustrating a hinge feature of the cable access door.

Returning to FIGS. 2 and 3, cable access door 50 includes support arms 100 which extend from and recede into arm slots 110 during opening and closing. With reference to FIG. 5, each support arm 100 includes an axle portion 260. Axle portion 260 rotates on lower hinge member 300. Upper hinge member 290 is generally U-shaped and retains axle portion 260 in position over lower hinge member 300. Upper hinge member 290 may also provide a friction fit against axle portion 260 to dampen rotation of cable access door 50. Lower housing portion 40 may include a depression 270 under each support arm 100 and each depression 270 may include an aperture 280. Together, depression 270 and aperture 280 provide sufficient clearance for support arm 100 to rotate to a closed position without striking the bottom surface of lower housing portion 40.

Housing 20 contains one or more circuit boards with one or more processors, memory, and program and data storage. The one or more circuit boards also include ports and/or input/output connectors 145 which are organized within a connector panel 140. Example ports and/or connectors 145 accessible through the connector panel 140 include network ports, serial ports, video ports, audio ports, and power connectors. Lower housing portion 40 includes an aperture 190 to facilitate routing of cables from under lower housing portion 40 to connector panel 140.

Figure 6:
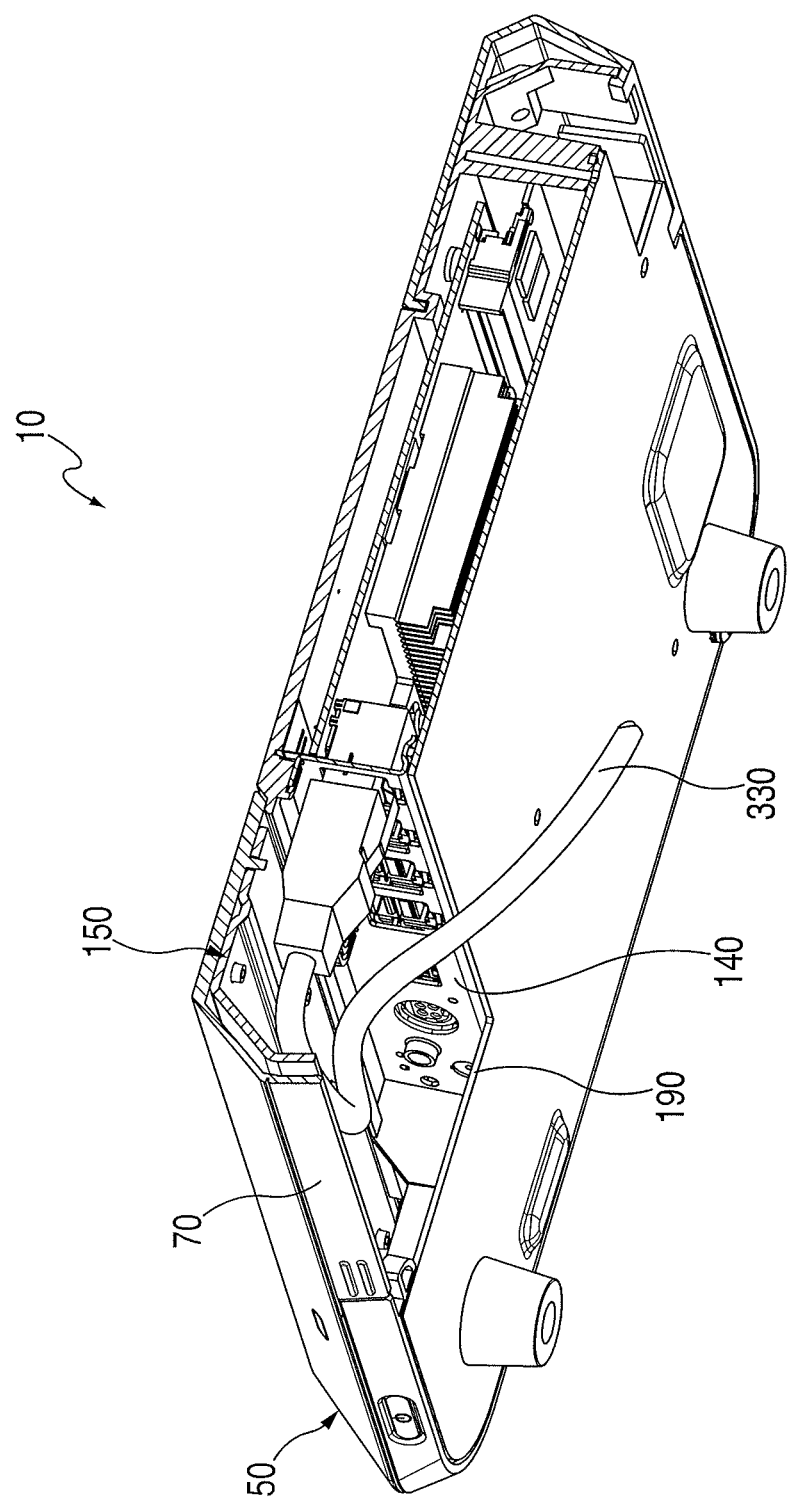
FIG. 6 is a cross-section of the example computer with the cable access door in the closed position.

With reference to FIG. 6, an example configuration is illustrated in which computer 10 is oriented with cable access door 50 facing an operator. In this configuration, cable 330 is routed below lower housing portion 40 and away from the operator to the opposite side of computer 10.

Other configurations are also envisioned. For example, cable access door 50 may be oriented away from an operator and cable 330 routed below and away from the operator.

Advantageously, cable access door 50 facilitates concealment of cable connectors and is secure from outward forces produced by cable 330. Cable 330 is hidden where it connects to connector 145 and where it runs beneath computer 10.

It is envisioned that computer 10 be used with various peripherals suited to its purpose. For example, computer 10 may include a point-of-sale (POS) terminal and include cable connectors for a monitor, cash drawer, receipt printer, and barcode scanner, in addition to network and other cable connectors. Other configurations are also envisioned.

Although the present invention has been described with particular reference to certain preferred embodiments thereof, variations and modifications of the present invention can be effected within the spirit and scope of the following claims.

What is claimed is:

1. A computer comprising:
   a housing including a cable access door having an open position and a closed position; and
   a connector within the housing for connecting to a cable originating from outside the housing;
   wherein the cable access door conceals the connector and the cable when the cable access door is in the closed position;
   wherein the cable access door comprises a snap which engages with a latch member in the housing to secure the cable access door in the closed position
   wherein the cable applies a transverse force to the snap that strengthens a locking force between the snap and the latch member.

2. The computer of claim 1, further comprising a connector panel containing the one connector and a plurality of additional connectors.

3. The computer of claim 1, further comprising a strengthening plate underlying the cable access door.

4. The computer of claim 3, wherein the strengthening plate is attached to the cable access door using heat stake posts.

5. The computer of claim 1, wherein cable access door further comprises a flexible opening portion which disengages the snap from the latch member when force is applied to the flexible opening portion.

6. The computer of claim 1, wherein the cable access door further comprises first and second pivoting arms at opposite ends of the cable access door.

7. The computer of claim 6, wherein the first and second pivoting arms are each coupled to corresponding hinge.

8. The computer of claim 1, wherein the housing further comprises an edge support member that supports an edge of the cable access door.

9. A computer comprising:
   a housing including an upper portion and a lower portion, wherein the upper portion includes a cable access door having an open position and a closed position, and wherein the lower portion includes an aperture opposite the cable access door; and
   a connector panel in the housing extending between the cable access door and the aperture, the connector panel including a plurality of connectors for connecting to cables originating from outside the housing and passing through the aperture from underneath the housing;
   wherein the cable access door conceals the connector and the cables when the cable access door is in the closed position;
   wherein the cable access door comprises a plurality of snaps which engage corresponding latch members in the housing to secure the cable access door in the closed position;
   wherein each latch member comprises a latch hook and each snap comprises a flexible snap hook which engages the latch hook;
   wherein cable access door further comprises a flexible opening portion coupled to the snaps which disengages the snap hooks from the latch hooks when an opening force is applied to the flexible opening portion;
   wherein the cables apply a force to the snaps that is transverse to a locking force between the snap and the latch member and that opposes the opening force.

\* \* \* \* \*